United States Patent [19]

Kishimoto et al.

[11] Patent Number: 4,919,776
[45] Date of Patent: Apr. 24, 1990

[54] FERROMAGNETIC POWDER AND METHOD FOR PRODUCING THE SAME

[75] Inventors: Mikio Kishimoto; Tomoji Kawai; Shichio Kawai, all of Osaka, Japan

[73] Assignee: Hitachi Maxell, Ltd., Osaka, Japan

[21] Appl. No.: 356,207

[22] Filed: May 24, 1989

Related U.S. Application Data

[60] Division of Ser. No. 145,878, Jan. 20, 1988, abandoned, which is a continuation of Ser. No. 751,726, Jul. 3, 1985, abandoned.

[30] Foreign Application Priority Data

Jul. 6, 1984 [JP] Japan .................. 59-141033

[51] Int. Cl.$^5$ .................. B01J 19/08; B05D 3/06
[52] U.S. Cl. .................. 204/157.4; 204/157.51; 427/53.1; 427/54.1
[58] Field of Search .................. 204/157.5, 157.51, 157.4; 427/53.1, 54.1

[56] References Cited

U.S. PATENT DOCUMENTS

| | | | |
|---|---|---|---|
| 4,016,057 | 4/1977 | Dezawa et al. | 204/130 |
| 4,178,416 | 12/1979 | Hector et al. | 428/539 |
| 4,264,421 | 4/1981 | Bard | 204/157.51 |
| 4,276,183 | 6/1981 | Wilson | 428/480 |
| 4,364,988 | 12/1982 | Andoh et al. | 428/212 |
| 4,420,537 | 12/1983 | Hayama et al. | 428/403 |
| 4,423,114 | 12/1983 | Saguchi et al. | 428/403 |
| 4,444,835 | 4/1984 | Togawa et al. | 428/329 |
| 4,559,237 | 12/1985 | Meier | 427/54.1 |

FOREIGN PATENT DOCUMENTS

| | | |
|---|---|---|
| 24714 | 7/1976 | Japan . |
| 122235 | 9/1980 | Japan . |
| 132005 | 10/1980 | Japan . |
| 60-136033 | 7/1985 | Japan . |

*Primary Examiner*—John F. Niebling
*Assistant Examiner*—Ben C. Hsing

[57] ABSTRACT

A method for producing ferromagnetic powder comprising metal oxide magnetic powder particles and a magnetic metal layer of at least one metal selected from the group consisting of iron, cobalt and nickel which layer is formed on a surface of the powder particle and has a magnetic easy axis of magnetization in substantially the same direction as that of the powder particle, which has improved coercive force and saturation magnetization, comprising irradiating with light a liquid medium dispersion containing the metal oxide magnetic particles, a reducing agent, and at least one metal ion selected from the group consisting of iron ion, cobalt iron, and nickel iron.

17 Claims, 2 Drawing Sheets

FERROMAGNETIC POWDER AND METHOD FOR PRODUCING THE SAME

This application is a divisional of copending application Ser. No. 07/145,878, filed on Jan. 20, 1988, abandoned, which in turn, is a continuation of application Ser. No. 06/751,726, filed on July 3, 1985, abandoned.

FIELD OF THE INVENTION

The present invention relates to ferromagnetic powder and a method for producing the same. More particularly, it relates to ferromagnetic powder suitable as a magnetic recording element for a coating type magnetic recording medium such as a magnetic tape, a magnetic disc and a magnetic card.

BACKGROUND OF THE INVENTION

Since a metal oxide magnetic powder such as iron oxide and chromium oxide magnetic powder has better magnetic stability than metal or alloy magnetic powder, it is conveniently used as a ferromagnetic powder for magnetic recording mediums. Recently, as the magnetic recording medium is designed to have better properties, attempts have been made on increasing the coercive force of the metal oxide magnetic powder so as to achieve high density recording and simultaneously increasing saturation magnetization of the magnetic powder so as to achieve large output such as high S/N ratio.

Although cobalt-containing iron oxide magnetic powder is modified to have the large coercive force required for high density recording by increasing the amount of cobalt content, its saturation magnetization is at most 80 emu/g, which is not sufficient for large output. The cobalt-containing iron oxide magnetic powder includes one in which cobalt and iron oxide form a homogeneous solid solution and one in which a layer containing cobalt oxide is formed on the surface of the iron oxide magnetic powder particle by treating the powder in an alkaline solution containing a cobalt salt.

As one kind of metal oxide magnetic powder having both large coercive force and large saturation magnetization, Japanese Pat. Kokai Publication (unexamined) No. 132005/1976 discloses chromium oxide magnetic powder having a metal cobalt coating formed by electroless plating. Japanese Pat. Publication 24714/1976 discloses magnetic powder produced by dispersing magnetite ($Fe_3O_4$) fine particles in an aqueous solution containing cobalt ion and precipitating metal cobalt on the surface of the fine particles by contacting the solution with a hydrogen reducing agent at a high temperature under a high pressure.

Since these types of magnetic powders have such structures that the metal cobalt layer is formed by reduction on the surface of the magnetic powder particles, they are expected to have not only large coercive force but also large saturation magnetization so that they are suitable for a magnetic recording medium with a high density recording and large output. However, in spite of the above characteristics, their squareness ratio (remanent magnetization/saturation magnetization) becomes smaller than that of the untreated magnetic powder, and dispersibility and orientation in a magnetic layer tend to be deteriorated. Thus, it is still desired to improve the properties of the magnetic powder which relate to the high density recording and large output of the magnetic recording medium.

SUMMARY OF THE INVENTION

One object of the present invention is to provide ferromagnetic powder comprising metal oxide magnetic powder on the surface of which particle, a magnetic metal layer such as a cobalt layer is formed so as to increase coercive force and saturation magnetization of the powder without substantially decreasing squareness ratio of the powder.

Another object of the present invention is to provide a method for producing such ferromagnetic powder.

DETAILED DESCRIPTION OF THE INVENTION

Figure 1A:
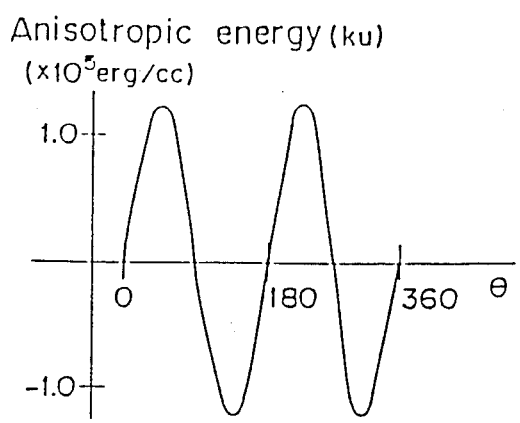
FIGS. 1A to 1C show characteristic magnetic torque curve of ferromagnetic powder of the invention.

As a result of investigation on decrease of the squareness ratio of the magnetic powder on which particle metal cobalt is deposited by reduction, it has been found that metal cobalt is not homogeneously deposited on the metal oxide magnetic powder particles which act as nuclei so that a part of metal cobalt forms an aggregation. Therefore, the particle shape such as a needle-shape of the nucleus is deformed, and a magnetic easy axis of magnetization of the deposited particles is not directed in the same direction as that of the nucleus but randomly directed. This would cause a decrease of the squareness ratio of the magnetic powder.

Reasons for this may be explained as follows:

Metal cobalt is deposited on the metal oxide powder particles by electroless plating by reducing cobalt ion in the aqueous solution. When the reducing agent such as sodium hypophosphite is used, the plating is carried out at temperatures at which the reducing agent is decomposed, for example, at a temperature higher than 80° C. for several minutes and over. When hydrogen is used, the plating is carried out under harsh conditions such as at a high temperature under a high pressure. Therefore, the deposition rate of metal cobalt is not adequately controlled by any of the above methods.

Among the cobalt-containing iron oxide magnetic powder, the present inventors paid attention to the powder on the surfaces of which particles, a cobalt oxide-containing layer is formed by treating the powder in an alkaline solution containing a cobalt salt. Since the cobalt oxide-containing layer is gradually formed under very mild conditions, the magnetic powder modified with cobalt has large coercive force, the original shape of the magnetic powder particle is maintained and further the cobalt oxide containing layer as a whole has a uniaxial anisotropy in the same direction as that of the magnetic easy axis of magnetization of the iron oxide magnetic powder so that the modified magnetic powder has substantially the same squareness ratio as that of the unmodified magnetic powder.

According to the above consideration, the present inventors have come to the conclusion that when metal cobalt is very slowly deposited homogeneously at least on the surface of the particle of a metal oxide magnetic powder such as an iron oxide magnetic powder, the deposited metal shows uniform adherence and has a magnetic easy axis of magnetization in substantially the same direction as that of the nucleus, i.e. the metal oxide magnetic powder particle, and thus ferromagnetic powder having substantially the same squareness ratio as that of the untreated metal oxide magnetic powder and also large coercive force and saturation magnetization is produced.

As a result of the extensive study to slowly deposit metal homogeneously only on the surface of the metal oxide magnetic powder particle, it has been found that semiconductive characteristics of the iron oxide magnetic powder and chromium oxide powder advantageously contribute to the deposition of metal cobalt by a photo-catalytic reaction.

In the photo-catalytic reaction, when semiconductive particles are dispersed in an aqueous medium and irradiated by light having energy larger than that of band gap energy between a valence band and a conduction band, electrons are transferred to the conduction band and positive holes are formed in the valence band, and the electrons and the positive holes diffuse in the particle and reach the surface of the particle. If the electric potential of the conduction band is higher than the hydrogen reduction potential, the electrons on the particle surface reduce water molecules (or protons) to generate hydrogen, and the positive holes deprive electrons in surrounding water and organic materials to oxidatively decompose them according to the electric potential of the valence band. The photocatalytic reaction is a noticeable reaction since it effectively promotes the oxidation and reduction without using any oxidizing agent or reducing agent.

In order to apply the photo-catalytic reaction to the deposition of metal cobalt on the surface of the magnetic powder particle, the semiconductive particles such as the metal oxide magnetic powder, for example, the iron oxide magnetic powder is reacted with cobalt ion in a polar solvent in which the semiconductive particles are dispersed in the presence of a reducing agent, while the positive holes react with the reducing agent to disappear, while the electrons remain on the particle surfaces so that the particles have higher electric potential than the reduction potential of cobalt ion. As the result, the particles strongly attract cobalt ion and reduce it to metal cobalt to form a cobalt metal layer on the magnetic powder particle surface.

The cobalt layer thus formed, homogeneously adheres to the surface of the metal oxide magnetic powder particle, namely the nucleus in comparison with cobalt metal layers formed by electroless plating or by the reduction at a high temperature under high pressure with hydrogen reducing agent, and further its magnetic easy axis of magnetization has, as a whole, uniaxial anisotropy in the same direction as that of the nucleus. According to the photo-catalytic method, the deposition of metal cobalt is controlled by adjusting luminous intensity and/or irradiation time so that the magnetic characteristics of the produced magnetic powder is precisely controlled.

According to one aspect of the present invention, there is provided ferromagnetic powder comprising metal oxide magnetic powder and a magnetic metal layer of at least one metal selected from the group consisting of iron, cobalt and nickel which layer is formed on a surface of the powder particle and has a magnetic easy axis of magnetization in substantially the same direction as that of the powder particle.

The ferromagnetic powder of the invention may be produced by dispersing metal oxide magnetic powder in a liquid medium containing a reducing agent and at least one kind of metal ion selected from iron ion, cobalt ion and nickel ion, irradiating the dispersion with light having energy larger than band gap energy between a valence band and a conduction band of the magnetic powder to reduce the metal ion and forming a magnetic metal layer on the surface of the powder particle.

As the liquid medium, water is preferably used although other polar solvents such as organic polar solvents may be used if the reducing agent can be dissolved in them, a metal salt is present in the form of ion in them and further they are inactive to the photo-catalytic reaction. The organic polar solvent may be used as such or as a mixture with water. Examples of such organic polar solvents are methanol, ethanol, dimethyl formamide, propylene carbonate, acetonitrile, etc.

The reducing agent may be the same as used in electroless plating and includes sodium hypophosphite, hydrazine, formalin, ethanol, formic acid, sodium formate and the like.

Iron, cobalt and nickel ions are supplied by dissolving their sulfate, chloride, nitrate, etc. in the liquid medium. The magnetic metals are used as an alloy of at least two of them.

In the liquid medium containing the reducing agent and the ion, the metal oxide magnetic powder is dispersed. Specific examples of the magnetic powder are iron oxide magnetic powder, cobalt-containing iron oxide magnetic powder, chromium oxide magnetic powder and barium ferrite powder. The cobalt-containing magnetic powder includes the above described solid solution type powder and the powder on the surface of which particle a cobalt oxide containing layer is formed. Although the cobalt-containing magnetic powder has a larger coercive force than the untreated cobalt-containing iron oxide magnetic powder, its coercive force is further increased and simultaneously its saturation magnetization is improved by the treatment of the invention.

Among the magnetic powder, the barium ferrite magnetic powder has a hexagonal plate shape with an average particle diameter of 0.05 to 0.3 $\mu$m. Other magnetic powder preferably has a needle like particle shape with an average acicular ratio (major axis/minor axis) of at least 2, preferably at least 3 and an average particle diameter of 0.1 to 0.5 $\mu$m. The magnetic powder to be used in the present invention has semiconductive characteristics. The band gap between the valence band and the conduction band of the magnetic powder has energy of about 0.1 to 5.0 eV, which can be excited by light having a wavelength of 200 to 800 nm. In case of the iron oxide ($\gamma$-$Fe_2O_3$) magnetic powder, its band gap has energy of about 2 eV. Since the level of the conduction band of the magnetic powder is lower than the hydrogen generating potential while the level of the valence band is deep, the positive holes on the particle surface easily oxidatively decompose the surrounding reducing agent.

Concentrations of the components contained in the dispersion depend on the amount of the magnetic metal to be deposited. In case of using water as the medium, preferably, the amount of the reducing agent is 1 to 200 g/l, that of the metal salt is 1 to 200 g/l, and that of the metal oxide magnetic powder is 1 to 100 g/l.

The dispersion may contain a suitable complex-forming agent and/or a pH adjuster. The complex-forming agent effectively forms a complex with metal and promote homogeneous deposition of metal. Its specific examples are sodium citrate, sodium tartrate, etc. The amount of the complex forming agent is 1 to 500 g/l. Specific examples of the pH adjuster are boric acid, ammonium sulfate, sodium hydroxide, potassium hydroxide, ammonia, etc. pH of the dispersion is adjusted in a range between 6.0 and 11.0, preferably between 7.0 and 10.0. When pH is too low, metal is not effectively deposited, while when it is too high, metal hydroxide is formed, which prevents formation of the magnetic metal layer.

The temperature of the dispersion is usually kept at a temperature at which the reducing agent is not thermally decomposed, for example, at a temperature of not higher than 80° C., preferably 10 to 60° C., especially around a room temperature during the irradiation of the dispersion. When the temperature is very high, it is difficult to homogeneously deposit the magnetic metal. Particularly, at such high temperature, as the reducing agent is thermally decomposed, the magnetic metal is deposited according to the mechanism of the electroless plating instead of the photo-catalytic reaction.

The dispersion is preferably agitated during irradiation. As described above, light should have energy larger than that of the band gap of the dispersed powder particle. Light having a wavelength of 200 to 800 nm is preferred. Light is not necessarily monochromatic light. Light sources which emits multi color light, such as a xenon lamp and a mercury lamp may be used.

During irradiation of the dispersion containing the metal oxide magnetic powder, the powder particle is excited by absorbing light having energy larger than its band gap energy so that electrons are transferred to the conduction band and the positive holes are formed in the valence band. The electrons and positive holes swiftly diffuse towards the surface of the particle. On the surface, the positive hole is reduced by the reducing agent and disappears while the reducing agent is oxidatively decomposed, so that only electrons remain on the surface of the particle and finally the potential of the surface exceeds the reduction potential. Then, the metal ion is attracted by the surface of the particle and reduced to metal.

Since the oxidative decomposition of the reducing agent and the reduction of the metal ion are induced by the positive holes and electrons which are formed on the surface of the metal oxide magnetic powder particle by the photocatalytic reaction, and further carried out at a comparatively low temperature, a very homogeneous magnetic metal layer without aggregating is formed in a comparatively long irradiation time, for example, 0.5 to 50 hours. The metal layer has the magnetic easy axis of magnetization in substantially the same direction as that of the nucleus particle since the former grows under the influence of magnetic field of the latter.

The wording "substantially the same direction" is intended to mean that the entire deposited metal does not necessarily have the magnetic easy axis of magnetization in the same direction as that of the nucleus particle but at least 50% of the deposited metal has such axis in the same direction as that of the nucleus particle.

The ferromagnetic powder has substantially the same squareness ratio as that of the untreated metal oxide magnetic powder. The absolute values of the coercive force and the saturation magnetization depend on the kinds of the magnetic powder and of the magnetic metal and their combination and are at least larger than those of the untreated magnetic powder. The most preferred magnetic metal to increase the coercive force and the saturation magnetization is cobalt as such and a cobalt-/iron or cobalt/nickel alloy. With such magnetic metal, the coercive force is increased by at least 20 oersteds, and the saturation magnetization is increased by at least 5 emu/g. The latter alloys are most preferred since they are excellent in oxidation resistance. Metal composition of the alloy depends on the coercive force and/or saturation magnetization to be achieved.

The deposited amount of the magnetic metal is preferably 2 to 150 parts by weight, more preferably 5 to 100 parts by weight based on 100 parts of the metal oxide magnetic powder. When it is too small, the coercive force and particularly the saturation magnetization are not desirably increased. When it is too large, the metal is not homogeneously deposited, and the direction of the magnetic easy axis of magnetization unpreferably becomes random.

Heat treatment of the ferromagnetic powder of the invention at 100 to 400° C., preferably 200 to 300° C. in an inert gas promotes crystallization of the magnetic metal so that the coercive force and the saturation magnetization are further increase and the squareness ratio is also further increased. In some combination of the metal oxide magnetic powder and the magnetic metal, the coercive force and the saturation magnetization are not satisfactorily improved only by the photo-catalytic reaction. In such case, the heat treatment is effective to increase the coercive force and the saturation magnetization to satisfactory extents. Needless to say, the magnetic easy axis of magnetization of the magnetic metal layer is not changed by the heat treatment.

The method for depositing metal on the nucleus by photo-catalytic reaction according to the present invention may be applied to the deposition of metal on a non-magnetic inorganic semiconductive powder.

In place of the magnetic metal, any other nonmagnetic metal may be deposited on the semiconductive powder by an analogous manner to the present invention. In cases where a magnetic powder to be used in a magnetic recording medium is used as a nucleus, highly conductive metal such as copper and silver is deposited on the powder particles so as to improve the conductivity of the magnetic powder and consequently to prevent noise due to elctrostatic charge. Further, to homogeneously disperse the magnetic powder when it is used in the magnetic recording medium, metal having good chemical affinity with a binder resin such as zinc chromium is deposited on the powder particles.

In addition, a non-magnetic inorganic powder may be used as nucleus. For fabricating the magnetic recording medium, principally used are the magnetic powder and the binder resin which disperses and binds the powder particles. However, since the coating surface of the magnetic recording medium is slid on a magnetic head and/or tape guides of a playback equipment, non-magnetic inorganic powder having large Mohs' hardness than the magnetic powder (e.g. $Al_2O_3$, $Cr_2O_3$, $TiO_2$, $\alpha\text{-}Fe_2O_3$, etc.) is often compounded in the magnetic coating in view of mechanical durability and traveling properties. On such filler, metal is deposited for the following purposes:

1. Since non-magnetic inorganic powder sometimes reduces the volume density of the magnetic powder in the magnetic coating, a magnetic metal such as iron, cobalt or nickel is deposited on the inorganic powder to magnetize the latter to a certain extent to prevent the reduction of the volume density of magnetic powder.

2. To impart the powder particles with dispersibility, a metal having chemical affinity with the binder resin is deposited on the powder particles.

3. To impart the powder particles with electroconductivity, a highly conductive metal, such as copper and silver is deposited on the powder particles.

The metal deposition may improve the magnetic properties, dispersibility and/or conductivity of the magnetic powder.

The present invention will be hereinafter explained further in detail by following Examples.

EXAMPLE 1

To a mixture of the following components, sodium hydroxide was added to adjust pH of the mixture to 9.0.

| | | |
|---|---|---|
| Cobalt sulfate | 35 g | |
| Sodium hypophosphite | 27 g | |
| Sodium citrate | 74 g | |
| Boric acid | 39 g | |
| Water | 1 l | |

To the thus formed aqueous mixture, added and thoroughly dispersed was needle-shaped $\gamma$-$Fe_2O_3$ (Coercive force=310 Oersted, Saturation magnetization=74.0 emu/g, Squareness ratio=0.48, Average major axis length=0.3 $\mu$m, Average acicular ratio (major axis/minor axis)=8) (20 g), and irradiated with a xenon lamp (500 W) with stirring at $\leq$ C. for 8 hours. The powder was then removed from the dispersion, washed with water and dried to obtain the ferromagnetic powder.

EXAMPLE 2

In the same manner as in Example 1 but adjusting pH of the mixture to 10.0 instead of 9.0, the ferromagnetic powder was produced.

EXAMPLE 3

In the same manner as in Example 1 but using a mercury lamp (500 W) in place of the xenon lamp, the ferromagnetic powder was produced.

COMPARATIVE EXAMPLE 1

In the same manner as in Example 1 but stirring the dispersion at 23° C. for 8 hours without irradiation, the ferromagnetic powder was produced.

COMPARATIVE EXAMPLE 2

In the same manner as in Comparative Example 1 but stirring the dispersion at 85° C., the ferromagnetic powder was produced.

COMPARATIVE EXAMPLE 3

In the same manner as in Example 1 but irradiating the dispersion with monochromic light having a wavelength of 1,000 nm which has smaller energy than the band gap energy of $\gamma$-$Fe_2O_3$, the ferromagnetic powder was produced.

EXAMPLE 4

In the same manner as in Example 1 but using hydrazine (300 ml) in place of sodium hypophosphite (27 g) and adjusting pH to 10.5 instead of 9.0, the ferromagnetic powder was produced.

EXAMPLE 5

In the same manner as in Example 1 but using 52.6 g of cobalt sulfate and 96 g of sodium citrate in place of 35 g of cobalt sulfate and 74 g of sodium citrate, the ferromagnetic powder was produced.

EXAMPLE 6

The ferromagnetic powder (2 g) produced in Example 1 was heated on a quartz board at 200° C. for 2 hours in a nitrogen stream to obtain the ferromagnetic powder.

EXAMPLE 7

In the same manner as in Example 6 but heating the ferromagnetic powder at 300° C. for 1 hour, the ferromagnetic powder was produced.

EXAMPLE 8

In the same manner as in Example 1 but using 21 g of cobalt sulfate and 13.2 g of nickel sulfate in place of 35 g of cobalt sulfate, the ferromagnetic powder was produced.

EXAMPLE 9

In the same manner as in Example 1 but using 28.1 g of cobalt sulfate and 7 g of ferrous sulfate in place of 35 g of cobalt sulfate, the ferromagnetic powder was produced.

EXAMPLE 10

In the same manner as in Example 1 but using 36.2 g of cobalt nitrate in place of 35 g of cobalt sulfate, the ferromagnetic powder was produced.

The magnetic properties of the thus produced ferromagnetic powder and those of untreated $\gamma$-$Fe_2O_3$ for comparison are shown in Table 1, in which uniaxial anisotropic energy is measured as follows:

The magnetic powder is dispersed in a solution of a polymeric binder in a weight ratio of the powder and the binder of 3:7 and coated on a film. Then, the powder is oriented in a magnetic field of 10 Koersteds and dried. The thus oriented magnetic sheet is punched in the form of a disk of 3 mm in diameter which is used as a sample for measuring magnetic torque. The magnetic torque is measured in the plane of the magnetic sheet in magnetic field of 10 Koersted by means of a highly sensitive magnetic torque meter.

Figure 1B:
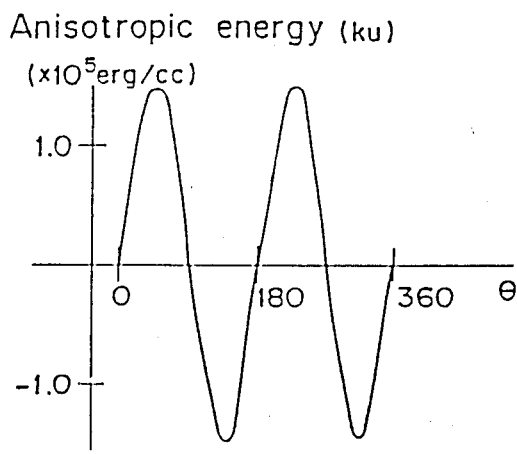
Figure 1C:
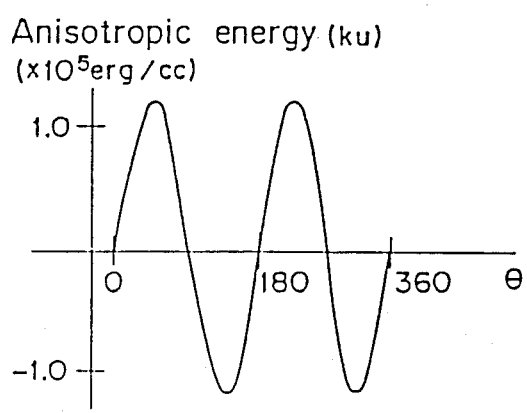
Figure 2:
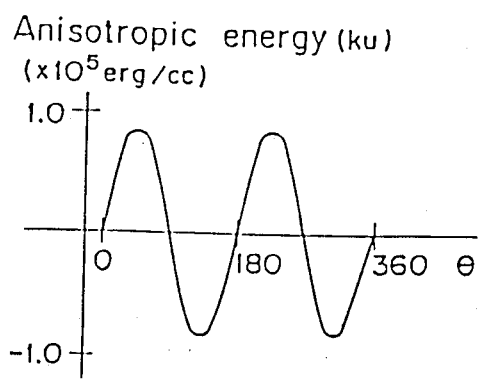
FIG. 2 shows characteristic magnetic torque curve of untreated $\gamma$-$Fe_2O_3$ powder.
Figure 3A:
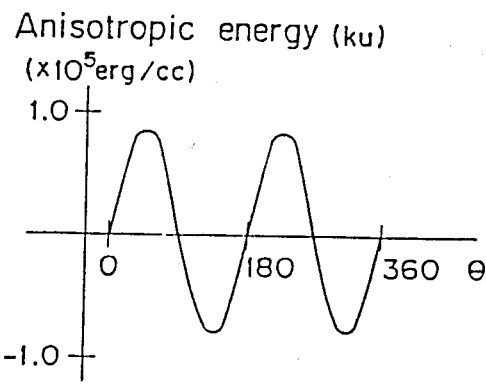
FIGS. 3A and 3B shows characteristic magnetic torque curve of comparative ferromagnetic powder.
Figure 3B:
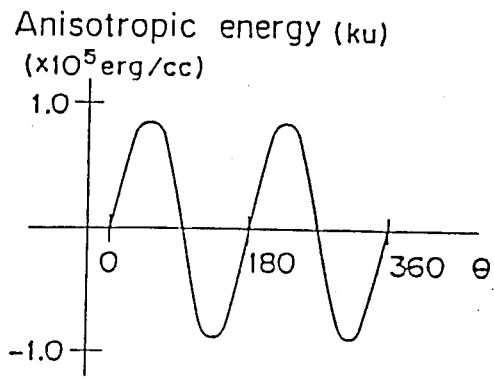

Some examples of the magnetic torque curves are shown in FIGS. 1 to 3. Among them, FIGS. 1A, 1B and 1C show the magnetic torque curves of three kinds of the ferromagnetic powder produced in Examples 1, 6 and 8, respectively, FIG. 2 shows that of untreated $\gamma$-$Fe_2O_3$ powder, and FIGS. 3A and 3B show those of two kinds of the ferromagnetic powder produced in Comparative Examples 1 and 2, respectively. The larger the amplitude of the magnetic torque curve, the larger the uniaxial anisotropy.

Anisotropy energy per unit volume (erg/cc) is calculated from the magnetic torque curve. The results are shown in Table 1 in terms of a ratio to that of untreated $\gamma$-$Fe_2O_3$ which is 1 (one).

TABLE 1

| Example No. | Coercive force (oersted) | Saturation magnetization (emu/g) | Squareness ratio | Uniaxial anisotropy energy |
|---|---|---|---|---|
| 1 | 525 | 86.5 | 0.47 | 1.5 |

TABLE 1-continued

| Example No. | Coercive force (oersted) | Saturation magnetization (emu/g) | Squareness ratio | Uniaxial anisotropy energy |
|---|---|---|---|---|
| 2 | 520 | 86.2 | 0.47 | 1.5 |
| 3 | 524 | 86.2 | 0.47 | 1.5 |
| Comp. 1 | 315 | 74.2 | 0.48 | 1.0 |
| Comp. 2 | 485 | 78.4 | 0.40 | 1.0 |
| Comp. 3 | 373 | 76.3 | 0.47 | 1.1 |
| 4 | 482 | 82.0 | 0.46 | 1.4 |
| 5 | 588 | 90.1 | 0.48 | 1.6 |
| 6 | 810 | 88.4 | 0.50 | 1.7 |
| 7 | 782 | 88.2 | 0.49 | 1.6 |
| 8 | 454 | 83.2 | 0.46 | 1.4 |
| 9 | 496 | 87.8 | 0.47 | 1.5 |
| 10 | 513 | 86.3 | 0.47 | 1.5 |
| $\gamma$-Fe$_2$O$_3$ | 310 | 74.0 | 0.48 | 1.0 |

EXAMPLE 11

In the same manner as in Example 1 but using an intermediate iron oxide between $\gamma$-Fe$_2$O$_3$ and Fe$_3$O$_4$ (Coercive force=412 Oersted, Saturation magnetization=76.5 emu/g, Squareness ratio=0.48, Average major axis length=0.3 $\mu$m, Average acicular ratio=8) in place of pure $\gamma$-Fe$_2$O$_3$, the ferromagnetic power was produced.

EXAMPLE 12

In the same manner as in Example 1 but using $\gamma$-Fe$_2$O$_3$ (Coeroive force=385 Oersted, Saturation magnetization=71.4 emu/g, Squareness ratio=0.44, Average major axis length=0.15 $\mu$m, Average acicular ratio=6), the ferromagnetic powder was produced.

EXAMPLE 13

In the same manner as in Example 1 but using needle-shaped cobalt-containing iron oxide powder (Coercive force=560 Oersted, Saturation magnetization=75.2 emu/g, Squareness ratio=0.49, Average major axis length=0.3 $\mu$m, Average acicular ratio=8), he ferromagnetic powder was produced.

EXAMPLE 14

In the same manner as in Example 1 but using needle-shaped chromium dioxide (Cr$_2$O$_3$) (Coercive force=540 Oersted, Saturation magnetization=74.0 emu/g, Squareness ratio=0.43, Average major axis length=0.35 $\mu$m, Average acicular ratio=10), the ferromagnetic powder was produced.

EXAMPLE 15

In the same manner as in Example 1 but using barium ferrite each particle having a hexagonal shape (Coercive force=880 Oersted, Saturation magnetization=54.2 emu/g, Squareness ratio=0.44, Average major axis length=0.15 $\mu$m), the ferromagnetic powder was produced.

The magnetic properties of the ferromagnetic powder produced in Examples 11 to 15 are shown in Table 2, in which results in parentheses are those for untreated magnetic powder used in each Example.

TABLE 2

| Example No | Coercive force (oersted) | Saturation magnetization (emu/g) | Squareness ratio | Uniaxial anisotropy energy |
|---|---|---|---|---|
| 11 | 585 | 87.2 | 0.48 | 1.6 |
|  | (465) | (76.5) | (0.48) | (1.1) |
| 12 | 505 | 82.8 | 0.43 | 1.5 |
|  | (385) | (71.4) | (0.44) | (1.0) |
| 13 | 733 | 86.1 | 0.49 | 1.7 |
|  | (560) | (75.2) | (0.49) | (1.4) |
| 14 | 625 | 80.4 | 0.45 | 1.6 |
|  | (540) | (74.0) | (0.43) | (1.3) |
| 15 | 975 | 67.3 | 0.44 | 1.8 |
|  | (880) | (54.2) | (0.44) | (1.6) |

What is claimed is:

1. A method for producing ferromagnetic powder comprising metal oxide magnetic particles and a magnetic metal layer of at least one metal selected from the group consisting of iron, cobalt and nickel which is formed on surfaces of the metal oxide magnetic particles and has a magnetic easy axis of magnetization in substantially the same direction as that of the metal oxide magnetic particles, which comprises dispersing metal oxide magnetic particles in a liquid medium containing a reducing agent and at least one metal ion selected from the group consisting of iron ion, cobalt ion and nickel ion to form a dispersion, irradiating the dispersion with light having energy which is larger than the band gap energy between the valence band and the conduction band of the metal oxide magnetic particles to reduce the ion and forming a magnetic metal layer on the surfaces of the metal oxide magnetic particles.

2. The method according to claim 1, wherein the band gap energy is 0.1 to 5.0 eV.

3. The method according to claim 1, wherein the liquid medium is a polar solvent which further contains a complex-forming agent and a pH adjuster.

4. The method according to claim 1, wherein the liquid medium is water.

5. The method according to claim 1, wherein the pH of the dispersion is from 6.0 to 11. 0.

6. The method according to claim 5, wherein the pH of the dispersion is from 7.0 to 10.0.

7. The method according to claim 1, wherein the temperature of the dispersion is not higher than 80° C.

8. The method according to claim 7, wherein the temperature of the dispersion is from 10 to 60° C.

9. The method according to claim 1, wherein the dispersion is irradiated by light having a wavelength of 200 to 800 nm.

10. The method according to claim 1, wherein the reducing agent is selected from the group consisting of sodium hypophosphite, hydrazone, formalin, ethanol, formic acid and sodium formate.

11. The method according to claim 1, wherein the ferromagnetic powder produced has a uniaxial anisotropy energy of at least $1.4 \times 10^5$ erg/cc and a squareness ratio which is substantially the same as that of said metal oxide magnetic particles.

12. The method according to claim 11, wherein the ferromagnetic powder produced further has a coercive force of at least 482 oersted and a saturation magnetization of at least 80.4.

13. The method according to claim 1, wherein the metal oxide magnetic particles are selected from the group consisting of iron oxide magnetic particles, cobalt-containing iron oxide magnetic particles, chromium oxide magnetic particles and barium ferrite particles.

14. The method according to claim 1, wherein the amount of the magnetic metal layer is from 2 to 150 parts by weight based on 100 parts by weight of the metal oxide magnetic particles.

15. The method according to claim 1, wherein the magnetic metal is selected from the group consisting of cobalt, cobalt/iron alloy and cobalt/nickel alloy.

16. The method according to claim 1, wherein the ferromagnetic powder produced has a coercive force of at least 482 oersted.

17. The method according to claim 1, wherein the ferromagnetic powder produced has a saturation magnetization of at least 80.4.

* * * * *